Figures 1, 2, 3:
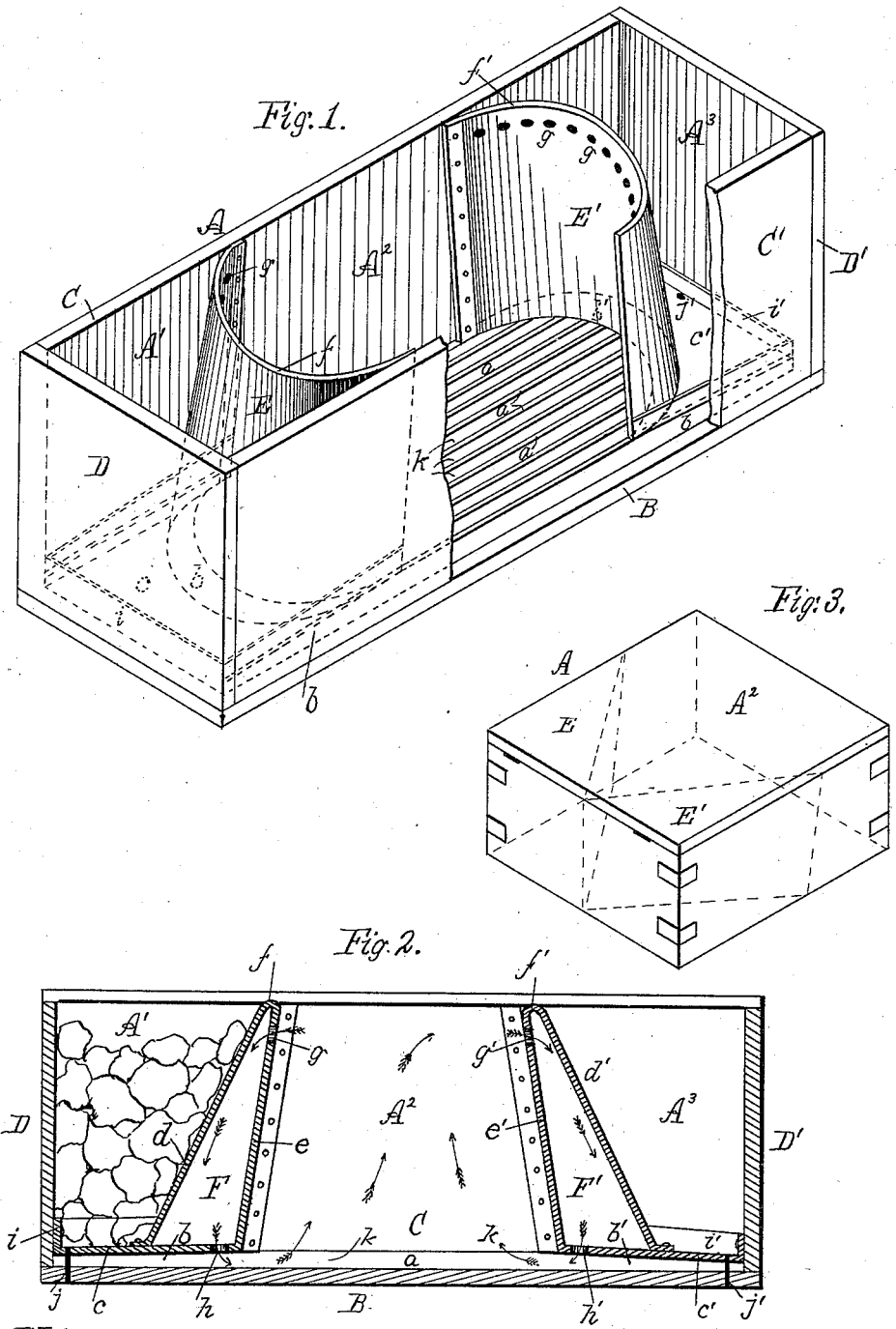

(No Model.)

J. J. FAYLE.
PORTABLE REFRIGERATING CHEST.

No. 307,533. Patented Nov. 4, 1884.

Witnesses.
H. C. Lodge
Thos. J. Bailey

Inventor.
Joseph J. Fayle.
F. Curtis, Atty.

UNITED STATES PATENT OFFICE.

JOHN JOSEPH FAYLE, OF MALDEN, MASSACHUSETTS, ASSIGNOR TO THE POST REFRIGERATING CAR COMPANY, OF PORTLAND, MAINE.

PORTABLE REFRIGERATING-CHEST.

SPECIFICATION forming part of Letters Patent No. 307,533, dated November 4, 1884.

Application filed June 14, 1884. (No model.)

*To all whom it may concern:*

Be it known that I, JOHN JOSEPH FAYLE, a citizen of the United States, residing at Malden, in the county of Middlesex and State of Massachusetts, have invented certain new and useful Improvements in Portable Refrigerating-Chests; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to chests to be used for various refrigerating purposes where the object to be preserved is to be retained in a receptacle which may easily and readily be handled and transported short distances, and differs in this respect from permanent structures for refrigerating purposes. The refrigerating-box containing my improvements I propose to use for carrying fresh meats, fruits, vegetables, or other perishable material short distances by express or freight; or it may be adapted to fit a close-covered wagon used in transporting perishable products, also for undertakers' purposes, and any general use where long journeys are not contemplated requiring a large amount of freezing material to be stored, and where attention can be readily given.

My invention consists in constructing a movable refrigerator-box with ice-reservoirs having no communication with the central preserving-chamber, and maintaining a current or circulation of chilled dry air throughout the latter, the current being secured by means of air-passages, the arrangement and construction of which will be more fully hereinafter explained.

The drawings accompanying this specification represent, in Figure 1, an isometric elevation, with a portion of the outer case removed, of a refrigerating-box embodying my improvements. Fig. 2 is a vertical longitudinal section of the same, while Fig. 3 represents a modified form of structure.

In the drawings, A represents an ordinary stout packing-box suitable for the purpose to which it is to be adapted, while B represents the bottom, C C' the sides, and D D' the ends, and to be provided with a tightly-fitting swinging or hinged cover. To prepare this box to enable it to be used for preserving its perishable contents in process of transportation, I arrange a series of wooden strips, $a\ a$, in parallel rows longitudinally upon the bottom of the box, for purposes hereinafter to be described, and form a long taper, $b\ b$, at their extremities, upon which rest metal partitions E E', a cross-section of which is shown in Fig. 2 of the drawings. These metal partitions are firmly bolted to the interior of the box proper, and subdivide it into three separate air-tight chambers, the two end ones, A' A³, being employed for ice-storage, while in the center and main compartment or refrigerating-room, A², are placed the articles to be preserved. The curved or angular shape of these partitions E E', as shown in the drawings, allows the ice in receptacles A' A³ to partly inclose the food or other substance to be refrigerated in the central space. As these metal structures are identical in form and construction, I will proceed to describe the one marked E, which is made of any suitable metal, galvanized iron preferred, with a base, $c$, and a curved upright wedge-shaped front with double walls $d\ e$, the thin edge of the wedge being uppermost.

One great object to be attained in constructing these boxes or chests is to have lightness and strength combined, and I have therefore made the ice-reservoir by employing a portion of each side and one end of the box A in connection with the plate $c$ for the bottom and $d$ for its inner end. In this way I avoid the use and weight of an entire metal box, as hitherto employed, and at the same time form the plates $d\ e$ curved and sloping, not only to brace and strengthen the box A, but likewise to prevent bulging or breaking of the inner plate, $d$, from shocks incidental to rough handling during transportation by the weight of ice resting thereon.

The air-chamber F is formed by a single metal plate bent at $f$, which thickens and strengthens the material at that point where it is subjected to blows from introducing the blocks of ice in renewing the refrigerating material, and is crescent-shaped in horizontal cross-section, that its walls $d\,e$ may strengthen the box. The upper portion of the plate $e$ is perforated with a series of holes, $g\,g$, while the inner end of the base-plate $c$ is likewise similarly bored at $h\,h$.

As the base $c$ rests upon the beveled ends of the strips $a\,a$, a slight incline is given thereto, sloping toward the end of the box A, while to prevent escape of melted ice or salt and ice the outer end of $c$ is turned up at $i$ and bolted or riveted as shown, and a drip-pipe, $j$, conducts the melted ice to the outside and permits it to escape.

Hitherto plain boxes for similar purposes above described have been employed with an iron ice-receptacle at either end, or the construction has been reversed, and the dressed meats or other articles to be preserved have been stored within a galvanized-iron box with the ice surrounding it. In neither of these systems has a circulation of cold dry air been provided for, which at present is considered positively essential to the proper preservation of perishable articles.

The above-described refrigerating-box allows a circulation of cold dry air consequent upon the ice-chambers having no communication with the preserving-chamber, and this I consider to be the essential and chief feature of my present invention, in connection with the arrangement for maintaining that circulation.

I will now proceed to show the air-currents, it being understood that the ice-chambers are filled with ice or some freezing-mixture and the box tightly closed, while the articles to be preserved are retained in the center or refrigerating chamber.

When the cover is closed, communication between the ice-reservoirs $A'\,A^3$ and the central chamber, $A^2$, is hermetically closed. As soon as the outer air is excluded by the closing of the box, the air within the chambers F F′, becoming chilled from contact with the plates $d\,d'$, against which the ice rests, descends from natural causes and passes out through the orifices $h\,h\,h'\,h'$, and spreads along the longitudinal passages $k\,k$, formed by the strips $a\,a$, secured to the floor. As it distributes itself among the articles stored in the central chamber, it becomes warmed and gradually rises, while still warmer air above enters through the holes $g\,g$ into the chambers F F′, to take the place of the air which has been previously chilled, and a double circulation is thereby induced and maintained as long as the box is kept closed and refrigerating material supplied.

The formation of a double wall or air-chamber between the articles and the ice I consider important in a high degree, as by this means all the condensation from the air takes place on the plates $d\,d'$, and prevents the perishable contents from being wet, which must inevitably occur in devices as hitherto constructed. The precipitation of moisture upon the plate $d$ and not upon the outside of $e$, together with the fact that the ice-reservoirs have no communication with the central storage-chamber, always insures the air being cold and dry—very important factors in the preservation of any perishable article. I moreover gain considerable cooling-surface, as the passages $k\,k$ extend under the plates $c\,c'$, which form the bottoms of the ice-reservoirs, and contact of air therewith thoroughly chills it, whence it passes out to aid the general cooling process. The strips $a\,a$ not only lift up the ice-chamber from the floor of the box, whereby increased cooling area is provided, but they permit of escape of chilled air from the bottom of the chambers F F′, and further raise the perishable contents from the floor and allow this cold air to circulate through and permeate the mass, whatever it may be. The air from the interior of the partitions, being cooled by the ice adjacent to the rear or outer walls thereof, passes down through ducts or apertures $h\,h'$ into the space which is left by the ribs $a$ extending the length of the box along the bottom thereof. Thence it passes up into the central preserving-space, $A^2$, and thence out through ducts or apertures $g\,g'$ to the interior of the partitions, thus keeping up a continual circulation of air, which is not brought into contact with the ice, and cannot be affected by impurities contained therein.

I do not desire to be limited to any particular form of metal partition provided with the double wall or air-space for purposes before described; but I prefer the form of the one herein shown, as it affords more room in the preserving-chamber, and still permits of a proper supply of freezing material.

I claim—

1. A refrigerating-chest provided with the ice-receptacles $A'$ and $A^3$ and the central space, $A^2$, in combination with the curved or angular partitions E E′, which allow the ice in said receptacles to partly surround the articles at the ends of said central space, substantially as set forth.

2. In combination with the terminal ice-receptacles A A′ and the central food receptacle or space, $A^2$, the curved or angular double walls E, with ducts and passages for allowing the circulation of air through them, and (by their shape) allowing the ice to partly surround the food, substantially as set forth.

3. The combination, with the refrigerating-chest A, provided with the ribs $a\,a$, tapered as stated, of the air-passages F F′ $k\,k$ and air-ducts $g\,g\,h\,h$, whereby an active dry circulation is maintained in the preserving-chamber, substantially as described.

4. The metal partitions E, having upper ducts, $g\,g'$, that open into central space, $A^2$, and lower ducts, $h\ h'$, which open through the bottoms of said partitions, in combination with the ice-receptacles A A' and the longitudinal ribs $a$, which form an air-space under the whole length of the box, in order that the air which has been chilled in said walls by the action of the ice may circulate, as described.

In testimony whereof I affix my signature in presence of two witnesses.

JOHN JOSEPH FAYLE.

Witnesses:
FREDERIC G. WHITE,
H. E. LODGE.